United States Patent [19]
Taylor et al.

[11] Patent Number: 5,511,388
[45] Date of Patent: Apr. 30, 1996

[54] WATER DISTILLATION UNIT FOR A REFRIGERATOR

[76] Inventors: James E. Taylor, 3833 Woelke Rd., Seguin, Tex. 78155; Robert J. Alderman, 1408 Brookstone, San Antonio, Tex. 78248; James P. Barrett, 1104 Edge Cliff Dr., Bedford, Tex. 76022

[21] Appl. No.: 215,914

[22] Filed: Mar. 22, 1994

[51] Int. Cl.$^6$ .................. C02F 1/04; F24F 3/14
[52] U.S. Cl. .............. 62/389; 62/238.5; 62/506
[58] Field of Search .......... 62/79, 238.5, 279, 62/389, 396, 506

[56] References Cited

U.S. PATENT DOCUMENTS

| | | | |
|---|---|---|---|
| 2,341,872 | 2/1944 | Kasold | 62/389 |
| 2,479,766 | 8/1949 | Mulvany. | |
| 2,589,406 | 3/1952 | Latham, Jr. | 202/75 |
| 2,619,453 | 11/1952 | Andersen | 202/75 |
| 2,658,358 | 11/1953 | Boling | 62/279 |
| 3,234,109 | 2/1966 | Lustender | 62/238.5 |
| 3,243,359 | 3/1966 | Schmidt | 202/174 |
| 3,334,026 | 8/1967 | Dobell | 203/10 |
| 3,404,537 | 10/1968 | Leonard, Jr. | 62/123 |
| 4,390,396 | 6/1983 | Koblenzer | 202/166 |
| 4,671,856 | 6/1987 | Sears | 203/22 |
| 4,946,558 | 8/1990 | Salmon | 202/167 |
| 5,110,418 | 5/1992 | Garrison et al. | 202/81 |
| 5,227,027 | 7/1993 | Topper | 203/10 |

FOREIGN PATENT DOCUMENTS

| | | | |
|---|---|---|---|
| 2219119 | 2/1973 | France | 62/389 |

*Primary Examiner*—Henry A. Bennet
*Assistant Examiner*—William C. Doerrler
*Attorney, Agent, or Firm*—Hopkins & Thomas

[57] ABSTRACT

A method and apparatus for distilling water in combination with a home use refrigerator (11) includes a water source (29) which feeds water into a preheater (23) in which the water is passed by a portion of the condenser coil (22) in heat exchange relationship. The water exiting the preheater (23) moves to a solenoid valve (31) which controls the flow of water into a boiler (32). Heated by a hot plate (33), water in the boiler (32) generates steam which is condensed in a condenser conduit (36) chilled by the refrigerator (11). The condensed purified water runs into a water collection chamber (34) for storage until either the water dispenser (12) or ice maker (15) requires water, at which time the appropriate valve (39, 41) will open and a pump (38) will pump the water to the appropriate device.

35 Claims, 4 Drawing Sheets

WATER DISTILLATION UNIT FOR A REFRIGERATOR

FIELD OF THE INVENTION

The present invention relates to a method and apparatus for distilling water for use in a refrigerator and is more particularly concerned with a distillation unit which recovers waste heat from a refrigerator for enhancing the heating of water and utilizes the chilled compartments of a refrigerator for enhancing the condensation of steam generated from the heated water.

BACKGROUND OF THE INVENTION

In recent years, the increasing amount of pollution found in the streams, rivers, wells, lakes and like sources used by local governments as sources for drinking water has raised the concerns of many. The sources of pollutants found in drinking water range from factory discharge and waste to the very chlorination process used by city water systems. Consequently, concern has grown regarding the scarcity of fresh drinking water. As a result, it is believed that the market for distilled bottled water and home distilling units will grow as public awareness increases.

In most circumstances, purchasing distilled bottled water for consumption at home would not be very practical because of the cost and the inconvenience associated with storing the water containers, handling the somewhat heavy containers and disposing of the container when empty. Consequently, home distilling units have a potential of becoming popular.

The general concept of a table-top distilling unit is disclosed in U.S. Pat. No. 4,052,267 to McFee. Home distilling units also have been disclosed in U.S. Pat. No. 4,946,558 as being combined with hot water heaters in an effort to save energy, by utilizing the waste heat generated from the distillation function to preheat the water entering the hot water heater.

Other configurations of distilling units designed to conserve energy are disclosed in U.S. Pat. No. 2,589,406 to Latham which utilizes the waste heat from an internal combustion engine used to drive the compressor associated with the distilling unit, and U.S. Pat. No. 2,479,766 to Mulvany which recovers and purifies water from the exhaust of an aircraft.

A distilling unit which takes advantage of the thermodynamic properties of refrigerants is disclosed in U.S. Pat. No. 5,227,027 to Topper. The device disclosed in Topper is a distillation unit having a heat pump system including a closed refrigerant circuit. The system utilizes condensed refrigerant to facilitate the boiling of the water and refrigerant vapor for absorbing and reclaiming the heat of the distillate in its condensation stage.

However, the known prior art does not teach a successful combination of a home refrigerator and a water distillation system which utilizes the waste heat from the condenser coils of the refrigerator to preheat the water moving to the distiller, and which uses a chilled compartment of the refrigerator to enhance the condensing of the purified vapors from the distiller so as to provide a convenient source of chilled purified water for driving and ice making at the refrigerator.

SUMMARY OF THE INVENTION

Briefly described, the present invention comprises an apparatus and method for distilling water in combination with a refrigerator for producing purified water which is dispensed from the refrigerator as chilled drinking water or used by the refrigerator in ice making. The present invention uses waste heat from the condenser coils of a refrigerator for preheating water supplied from a conventional source such as water supplied from a city water supply system. The preheated water is fed to a distiller where it is vaporized and the vapor is moved into a chilled compartment of the refrigerator for enhancing the condensing of the purified vapor.

The distilling unit is integrated into a refrigerator and comprises a water source under pressure which feeds the preheated city water to a flow control device which drips the water into a boiler. The flow control device is actuated in response to the temperature of the boiler. The city water fed into the boiler is heated sufficiently to generate steam which is communicated to the condenser conduit positioned substantially internally to the refrigerator so that the chilled compartment of the refrigerator enhances the condensation of the steam from the heated water. The condensed purified water drains into a collection chamber located in the refrigerator by means such as gravity where it is stored until a demand pump delivers the purified water to either the drinking water dispenser or to the ice maker.

A feature of the present invention is a removably mounted boiler. This allows tier replacement of the boiler when sediment concentrations from boiling water collects to an undesirable level.

In the preferred embodiment, the means for heating the city water includes a preheating stage and a primary heating stage. In the preheating stage, the city water is passed in a heat exchange relationship with the compressed refrigerant exiting the compressor of the refrigerator so that the temperature of the water is raised by the heat of the hot refrigerator. The preheated water is then fed into the boiler, where an electric induction heater sufficiently heats the water so as to generate steam.

Alternatively, in a second embodiment, the means for heating the city water comprises a primary heating means in which the water source under pressure feeds the water directly to the boiler without preheating the water. The electric induction heater associated with the boiler heats the water in the boiler sufficiently to generate steam.

Accordingly, it is an object of the present invention to provide a convenient home water distiller to be used in combination with a refrigerator wherein the purified water produced is chilled and dispensed as drinking water or used to make ice.

Another object of the present invention is to provide an improved water distiller for use with a refrigerator wherein the heat emitted from condenser coil of the refrigerator is used to preheat the incoming city water prior to feeding the water into the boiler of the water distiller.

Another object of the present invention is to provide an improved water distiller for use with a refrigerator wherein a chilled compartment of the refrigerator houses a portion of the water vapor condenser conduit so as to enhance condensation of the purified steam generated in the boiler of the distiller.

A further object of the present invention is to provide a water distiller for use with a refrigerator which is efficient, cost effective and convenient to use.

Other objects, features and advantages of the present invention will become apparent upon reviewing the following specification when taken in conjunction with the accompanying drawings.

DETAILED DESCRIPTION OF THE PREFERRED EMBODIMENT

Figure 1:
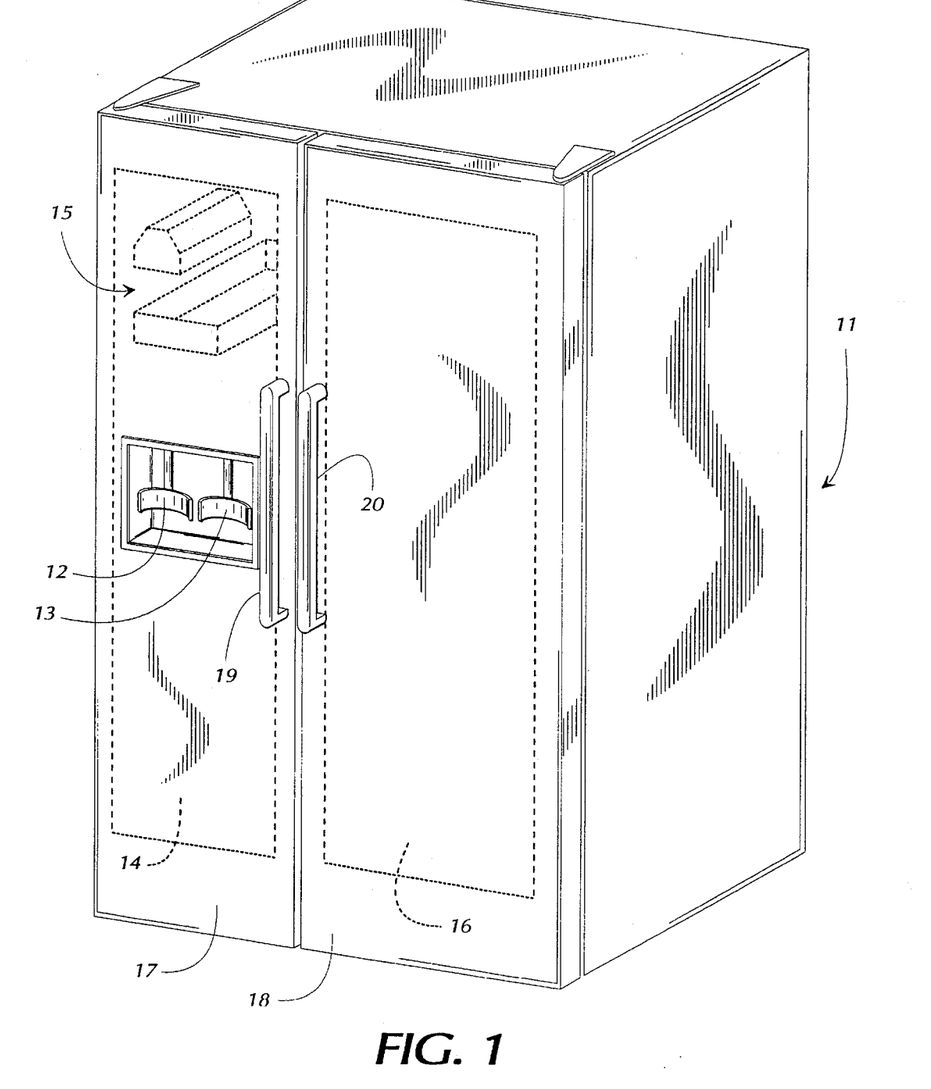
FIG. 1 is a perspective view of a refrigerator having a water and ice dispenser.

Referring in more detail to the drawings in which like numerals indicate like parts throughout the several views. FIG. 1 illustrates a refrigerator 11 having a water distiller in accordance with the present invention such that the water dispenser 12 dispenses purified water and the ice dispenser 13 dispenses ice made of purified water. The refrigerator housing 11 comprises two interior chilled compartments: a freezer compartment 14 which houses the ice maker 15 and a chiller compartment 16. Either compartment 14 or 16 may be accessed by opening their associated door 17 or 18 by handles 19 or 20 respectively.

Figure 2:
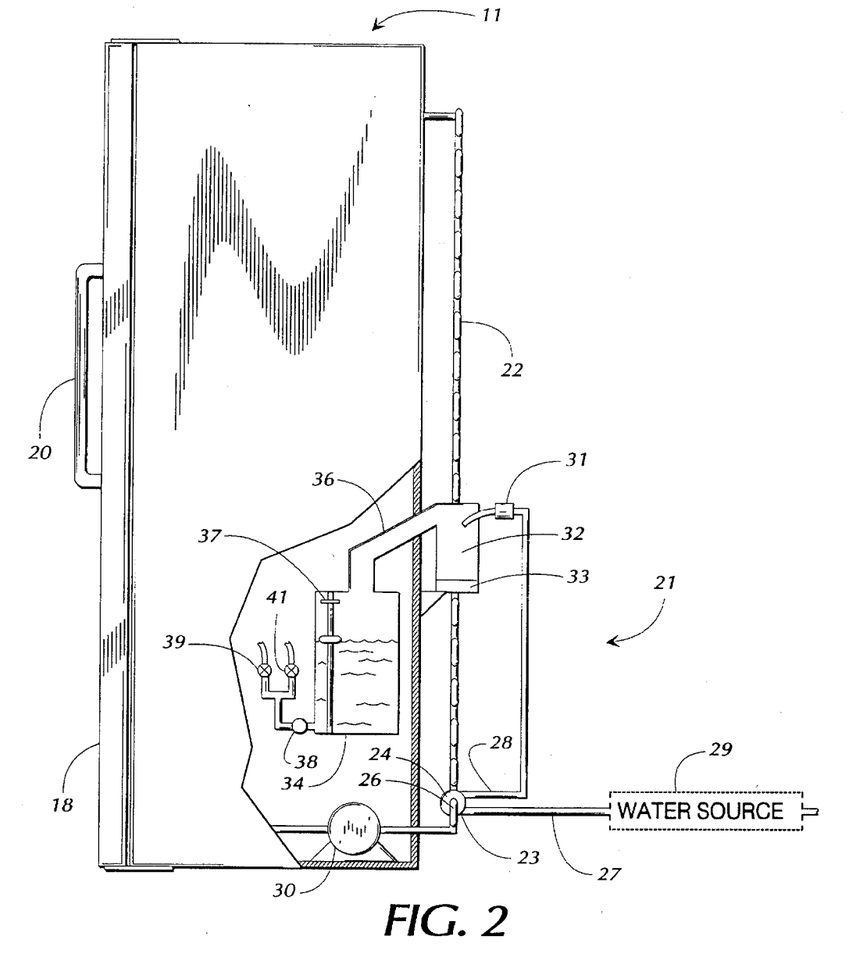
FIG. 2 is a partially cutaway side elevational view of the refrigerator in FIG. 1 having a water distiller schematically illustrated at the rear of the refrigerator.
Figure 3:
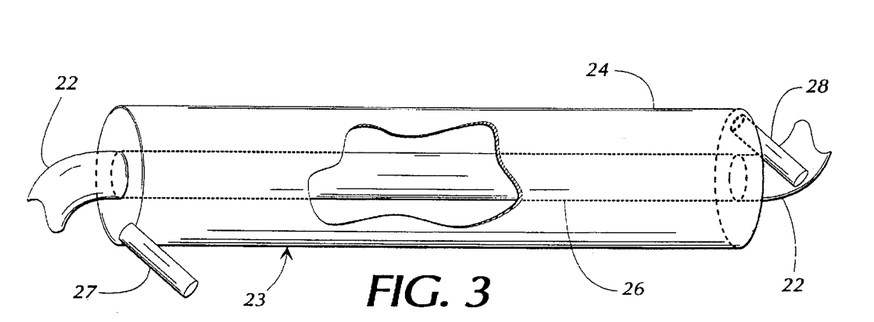
FIG. 3 is a partially cutaway perspective view of the preheater assembly shown in FIG. 2 having phantom lines showing the inner conduit.

As illustrated in FIG. 2, the refrigerator 11 includes its typical closed cycle refrigeration system, including a compressor 30 for compressing the refrigerant gas of the refrigerator, a condensing coil 22 for transferring the heat of the refrigerant gas to the atmosphere, an expansion valve (not shown in FIG. 1) for permitting the compressed refrigerant gas to expand, and an evaporator (not shown). The distilling unit 21 is illustrated at the rear of refrigerator 11. Preheater 23 is positioned contiguous the point where the condenser coil 22 exits the rear of refrigerator 11. As best illustrated by FIG. 3, preheater 23 is a cylindrical elongated member comprising an inner conduit 26 and an outer concentric conduit 24 which surrounds the inner conduit 26. Inner conduit 26 is in open communication with condenser coil 22 so that the hot refrigerant gas from the compressor 30 flows through the inner conduit 26 on the way to the condenser coil 22. Inner conduit 26 passes compressed refrigerant and outer conduit 24 passes water so that the heat exchange between the two preheats the water. The water in outer conduit 24 enters through inlet pipe 27 connected to a water source 29 and exits through exit pipe 28 connected to a solenoid valve 31, as seen in FIG. 2.

Referring to FIG. 2, the preheated water exiting preheater 23 is conducted by exit pipe 28 to a flow control device such as solenoid valve 31 for controlling the flow of water into the boiler 32. The water fed into boiler 32 is heated by a water heating means such as the electric induction heater 33 so as to generate steam.

Boiler 32 is removably mounted to refrigerator 11 so that it may be periodically replaced. The sediment left by the vaporized water collects in the bottom boiler 32 and can be removed from the distiller by replacing boiler 32 at a predetermined interval depending upon various factors such as the concentration of sediments or the volume of water distilled.

Mounted substantially internally to refrigerator 11 is the condenser conduit 36 which is fixed at one end to the top of boiler 32 and at the other end to a water collection chamber 34. The water collection chamber 34 is positioned within refrigerator 11 and comprises a normally opened float switch 37 for following the level of water in water collection chamber 34. A pump 38 disposed at the bottom of water collection chamber 34 pumps water through valves 39 to water dispenser 12 and/or through valve 41 to ice maker 15, neither of which is shown.

Figure 4:
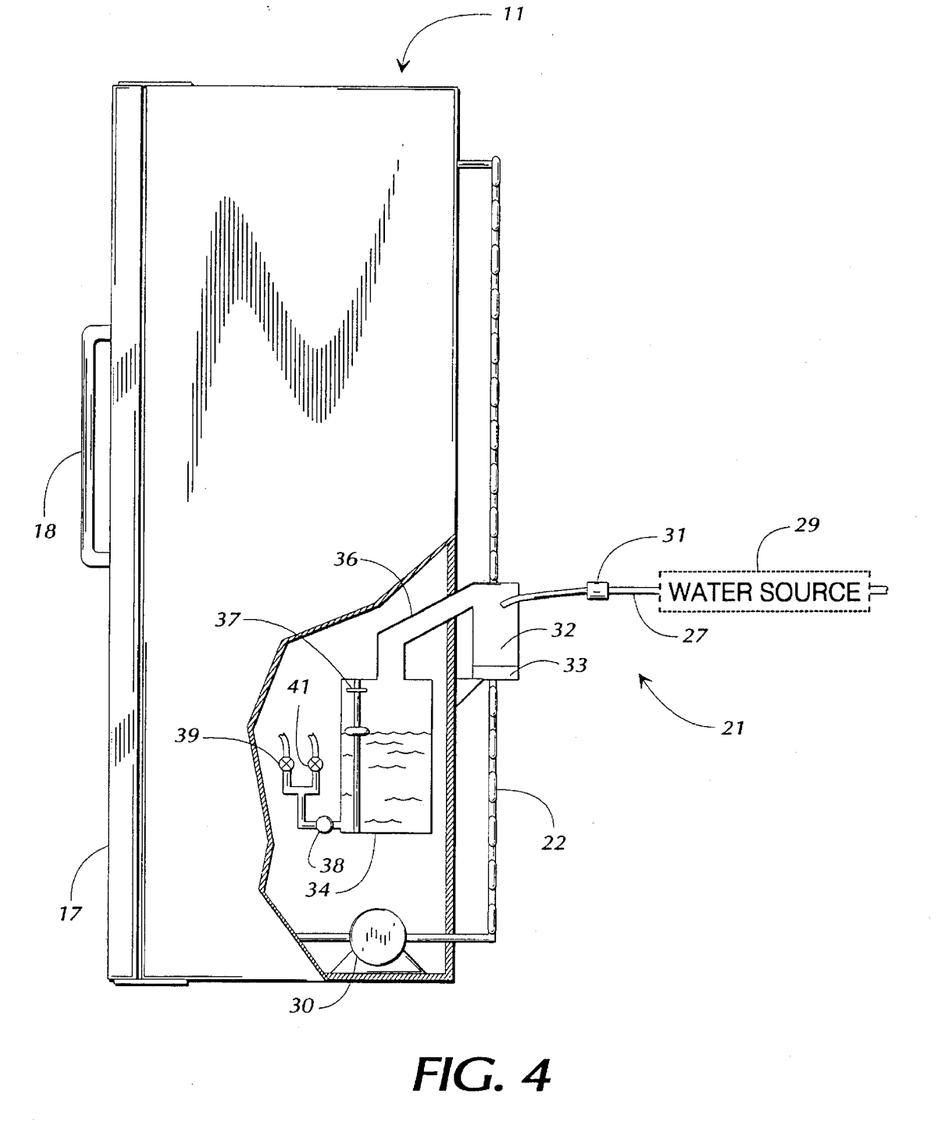
FIG. 4 is a partially cutaway side elevational view of the refrigerator in FIG. 1 having a water distiller in accordance with an alternate embodiment of the present invention.

In an alternative embodiment, as illustrated in FIG. 4, the distilling unit 21 does not have a preheater 23, but rather feeds water directly to solenoid 31 from water source 29.

Figure 5:
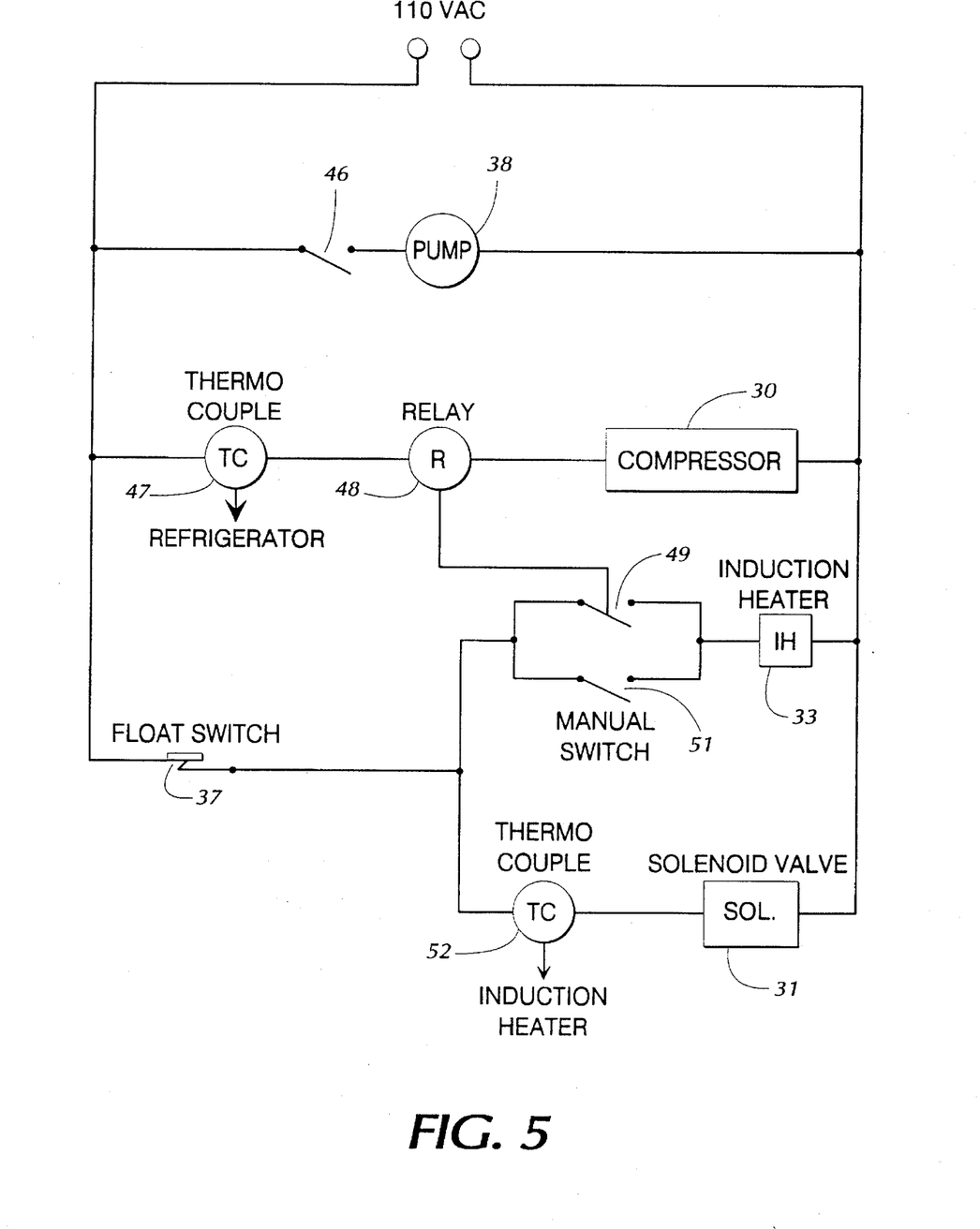
FIG. 5 is a block diagram of the control circuitry of the present invention.

The control circuitry of the present invention is shown in FIG. 5. The elements shown do not represent the complete conventional control circuitry associated with refrigerator 11 but merely the elements necessary to illustrate the operation of the distilling unit 21. The circuit is powered by a 110 V ac source connected in parallel with the elements as shown. Pump 38 supplies water from the water collection chamber 34 to water dispenser 12 or ice marker 15. Pump 38 is actuated by a switch 46 which closes in response to either the lever associated with the water dispenser 12 being actuated to retrieve cold water or the ice maker 15 requiring water to make ice. The compressor 30 is connected in parallel with pump 38 and is actuated by a thermocouple switch 47, triggered by the rising and falling temperature of the interior compartments 14, 16 of the refrigerator 11. When compressor 30 is actuated, relay 48 is energized closing switch 49.

Float switch 37 is connected in series with two parallel elements, solenoid 31 and induction heater 33. Consequently, neither solenoid valve 31 nor induction heater 33 can be actuated without normally open float switch 37 being closed. If the float switch 37 is closed, induction heater 33 may be actuated by either relay 48 or a manual switch 51. Likewise, if float switch 37 is closed, solenoid valve 31 may be actuated by thermocouple 52 which is triggered by the temperature of induction heater 33.

In the operation of the preferred embodiment, as illustrated in FIG. 2, water source 29 feeds water under pressure to preheater 23 through pipe 27. The water in outer conduit 24 of preheater 23 is passed in heat exchange relationship with the compressed refrigerant passing through inner conduit 26. The heat exchange which takes place preheats the water in preheater 23. Water exits preheater 23 through pipe 28 which conducts the water to solenoid 31.

As depicted by the circuit in FIG. 5, two events must simultaneously occur before solenoid valve 31 is actuated and thereby allow the flow of water into boiler 32. First, normally opened float switch 37 must be closed. This occurs when the water level in water collection chamber 34 falls below a predetermined level. Secondly, the temperature of induction heater 33 must reach approximately 225° F., triggering thermocouple switch 52. Thus, induction heater 33 must be actuated and heated to a predetermined temperature before water is fed into boiler 32. Preferably, induction heater 33 is of the type that when actuated will heat to a maximum temperature of approximately 240° F. and substantially remain at that temperature until deactivated.

The induction heater 33 is actuated upon the occurrence of two events. First, the level of water in the water collection chamber 34 must drop below a predetermined point which closes the normally open float switch 37 associated with the water collection chamber 34. Secondly, either manual switch 51 or relay switch 49 must close. Relay switch 49 closes only when the refrigerator compressor 30 is in operation. Alternatively, switch 51 is a manual switch which bypasses relay switch 49 so that the distilling unit 21 can run independently of compressor 30. However, if compressor 30 is not actuated, compressed refrigerant gas is not passing through condenser coil 22, and therefore, the water is not being preheated by heat exchanger 23.

Upon occurrence of compressor 30 being energized and the float switch 37 calling for more water, induction heater 33 is actuated and begins heating. When induction heater 33 reaches approximately 225° F., thermocouple switch 52 closes and solenoid 31 begins to feed water into boiler 32 at a controlled flow rate. The flow rate of water into boiler 32 is such that the water substantially vaporizes upon contact with the heating element of boiler 32.

The water fed into boiler 32 is heated by induction heater 33 so as to generate steam which is directed to condenser conduit 36, as illustrated in FIG. 2. A substantial portion of condenser conduit 36 is disposed internally to refrigerator 11 which is chilled so as to enhance the condensation of the purified water vapors from boiler 32. The purified water which condenses on the interior walls of condenser conduit 36 runs into water collection chamber 34 by means such as gravity where it is stored until used. A feature of the present invention is that the water is chilled by refrigerator 11 while being stored in water collection chamber 34. Consequently, the ice maker 15 is made more efficient because it uses chilled water and not water at room temperature.

When the water dispenser 12 is actuated, by placing a glass in the receptacle in the door of the refrigerator, a switch 46 opens valve 39 and energizes pump 38, pumping water from water collection tank 34 to water dispenser 12. Alternatively, when ice maker 15 requires water, valve 41 opens and pump 38 is actuated by switch 46 and water is pumped to ice maker 15, As shown in FIG. 4, an alternative embodiment of the present invention feeds water from water source 29 directly to solenoid valve 31 without preheating the water. As a result, a greater amount of energy is consulted by hot plate 33 to heat the water sufficiently to generate steam therefrom. In all other regards, the alternative embodiment depicted in FIG. 4 operates substantially the same as the preferred embodiment depicted in FIG. 2.

Although the invention has been disclosed as having a pump or other means for delivering the distilled water to the ice maker or to the water dispenser at the front door of the refrigerator cabinet, the distilled water can be collected inside the refrigerator cabinet in a removable container or other receptacle, if desired.

Thus, it can be seen that the present invention comprises an efficient and convenient apparatus for distilling water in association with a refrigerator. While the invention has been shown and described as what is presently believed to be the most practical and preferred embodiment thereof, it will be apparent that modifications and variations within the scope and spirit of the invention are possible, and that the invention is to be afforded the interpretation so as to encompass all of the equivalents thereof, as set forth in the following claims.

I claim:

1. A household refrigerator having a water source, a chilled compartment, a freezer, an ice maker, and a water dispenser, the improvement therein of:

water distilling means for generating distilled water for dispensing as drinking water and for forming ice, said water distilling means comprising:

a boiler for receiving water from said water source and means for heating water to a temperature sufficient to boil water in said boiler and to generate steam from the boiled water;

a distilled water collection chamber;

condenser means in communication with said boiler for receiving and condensing the steam generated from boiling the water in said boiler and passing the distilled water to said collection chamber, said condenser means disposed in heat exchange relationship with respect to said chilled compartment;

means for transporting the distilled water under pressure from said distilled water collection chamber selectively to said water dispenser or said ice maker; and control means for detecting the amount of water in said collection chamber and controlling the actuation of said distilling means.

2. The refrigerator of claim 1, and further comprising a second monitoring means for detecting the temperature of said boiler and a second control means responsive to said second monitoring means for controlling the flow of water from said water source to said boiler.

3. The refrigerator of claim 1, wherein the condenser means comprises a tubular member affixed at one end to said boiler and at its other end to said distilled water collection chamber.

4. The refrigerator of claim 1, wherein the means for heating water in said boiler comprises a primary heating means contiguous said boiler and capable of bringing the water in said boiler to a boil.

5. The refrigerator of claim 1, wherein the means for heating water in said boiler comprises a preheating means and a primary heating means.

6. The refrigerator of claim 5, wherein said refrigerator includes a condenser coil containing compressed heat exchange fluid, and wherein said preheating means comprises heat exchange means for passing water from said water source in heat exchange relationship with respect to said condenser coil.

7. The refrigerator of claim 6, wherein said heat exchange means includes an outer conduit passing water from said water source and an inner conduit disposed internally of said outer conduit and said inner conduit comprising a portion of said condenser coil passing compressed heat exchange fluid to said freezer.

8. The refrigerator of claim 5, wherein said primary heating means is contiguous said boiler and includes an electric induction heater of a capacity sufficient to boil water in said boiler.

9. The refrigerator of claim 1, and further comprising means for removably mounting said boiler to said distiller independently of said condenser means.

10. The refrigerator of claim 1, and further comprising a flow control device for controlling the rate of water flow into said boiler so that the water is substantially immediately vaporized upon contact with said boiler.

11. A household refrigerator, comprising:

a chilled compartment and means for maintaining first chilled compartment at substantially 34° and above;

a freezer compartment adjacent to said chilled compartment and means for maintaining said second chilled compartment at substantially 32° and below;

a boiler contiguous said chilled and freezer compartments and means for heating water in said boiler sufficiently to generate steam;

a water source and means for dispensing water from said water source to said boiler;

means for condensing the steam from water heated in said boiler, said means in heat exchange relationship with respect to said chilled compartment; and means for collecting the purified water generated from condensing said steam, said means substantially mounted in said refrigerator.

12. The refrigerator of claim 11, and further comprising a flow control device for controlling the flow of water from said water source to said boiler so that the water substantially immediately vaporizes upon contact with said boiler.

13. The refrigerator of claim 11, wherein the means for heating the water in said boiler comprises a primary heating means contiguous said boiler.

14. The refrigerator of claim 11, wherein the means for heating the water in said boiler comprises a preheating means and a primary heating means.

15. The refrigerator of claim 14, wherein said refrigerator includes a condenser coil containing compressed heat exchange fluid, and wherein said preheating means comprises heat exchange means for passing water from said water source in heat exchange relationship with respect to said coil.

16. A process of distilling water for use as drinking water and for forming ice in association with a household refrigerator having a chilled compartment, comprising the steps of:

receiving water from a water source into a boiler;

heating water in said boiler sufficiently to generate steam;

condensing the steam from said heated water in a condenser disposed substantially in heat exchange relationship with respect to said chilled compartment of said refrigerator;

receiving the distilled water from the condenser into a water collection chamber mounted in said refrigerator;

transporting water from said water collection chamber to the water dispenser or ice maker;

monitoring the level of water in said water collection chamber;

preventing the flow of water into said boiler and the heating of water when the water level in said water collection chamber is above a predetermined level;

heating said boiler when the water level in said water collection chamber drops below a predetermined level and the refrigerator compressor is running or a manual switch is enabled; and controlling the flow of water from said water source to said boiler based upon the temperature of said boiler.

17. The method of claim 14, and further comprising the steps of removably mounting said boiler so that it may be replaced when impurities from said heated water have collected therein.

18. The method of claim 14, wherein the step of heating water comprises a primary heating means sufficient to heat water in said boiler so as to generate steam from the heated water.

19. The method of claim 14, wherein the step of heating water comprises a preheating stage of passing the water from said water source in a heat exchange relationship with the condenser coil of said refrigerator so as to preheat the water, and a primary heating means sufficient to heat water in said boiler so as to generate steam.

20. In a refrigerator for home use which includes a compressor for compressing refrigerant gas and a refrigerant gas condenser for cooling the compressed refrigerant gas, the improvement therein of:

a water distiller including a boiler for boiling water, water conduit means in communication with said boiler for delivering water to said boiler, a water condenser in communication with said boiler for condensing the water vapor emitted from said boiler, and a water preheater in heat exchange relationship with the hot refrigerant gas of said refrigerant gas condenser and the water of said water conduit means for preheating the water with the heat of the refrigerant gas before the water is boiled by said boiler.

21. A process of distilling water in combination with the operation of a home use refrigerator comprising:

moving water from a source of water into heat exchange relationship with a refrigerant gas condenser of a home use refrigerator so as to preheat the water;

moving the preheated water from the refrigerant gas condenser of the refrigerator to a boiler and heating the water to a temperature sufficient to vaporize the water;

moving the water vapor into heat exchange relationship with a chilled area of the refrigerator to condense the vapor into water; and collecting the water in a chilled area of the refrigerator.

22. The process of distilling water as set forth in claim 21 and further including the step of terminating the heating of the water in response to collecting a predetermined amount of the water.

23. The process of distilling water as set forth in claim 21 and further including the step of heating the water only in response to the compressor of the refrigerator being operated.

24. A refrigerator having a housing defining a chilled compartment, a refrigeration system including a compressor, a condenser and an evaporator for generating cold coolant fluid for cooling said interior compartment and a water dispenser for dispensing water received from a water source and cooled in said housing, the improvement therein of:

water distilling means for generating distilled water for dispensing as drinking water from said water dispenser, said water distilling means comprising:

a boiler including means for heating water to a temperature sufficient to boil water in said boiler and to generate steam from the boiled water;

conduit means for moving water from the water source to said boiler;

a distilled water collection chamber;

condenser means in communication with said boiler for receiving and condensing the steam generated from boiling the water in said boiler and passing the distilled water to said collection chamber, said condenser means disposed in heat exchange relationship with respect to said chilled compartment;

means for transporting the distilled water from said distilled water collection chamber to said water dispenser; and control means for detecting the amount of water in said collection chamber and controlling the actuation of said distilling means.

25. The refrigerator of claim 24 and further including a heat exchanger for transferring heat between the condenser of the refrigeration system to the water moved through said conduit means toward said boiler.

26. The refrigerator of claim 24, wherein said heat exchanger includes an outer conduit passing water from said water source and an inner conduit disposed internally of said outer conduit and said inner conduit comprising a portion of said condenser passing compressed heat exchange fluid to said interior chamber.

27. A household refrigerator comprising:

a housing defining an interior compartment, a refrigeration system including a compressor, a condenser, and an evaporator for generating cold coolant fluid for cooling said interior compartment, a boiler contiguous said chilled compartment and means for heating water in said boiler sufficiently to generate steam;

conduit means for dispensing water from a water source to said boiler;

a heat exchanger for transferring heat from said condenser to the water moving through said conduit means toward said boiler;

means for condensing the steam from water heated in said boiler; and means for collecting the purified water generated from condensing said steam and for dispensing the purified water from said housing.

28. The refrigerator of claim 27, and further comprising a flow control means for controlling the flow of water from said water source to said boiler so that the water substantially immediately vaporizes upon contact with said boiler.

29. A process of distilling water for use as drinking water in association with a refrigerator, the refrigerator having a refrigeration system for chilling a compartment within said refrigerator and including a compressor, a condenser and an evaporator, comprising the steps of:

moving water from a water source through a heat exchanger into a boiler;

preheating the water moving through the heat exchanger with heat emitted from the condenser of the refrigeration system;

heating the preheated water in the boiler sufficiently to generate steam;

condensing the steam from said heated water in a water vapor condenser which is in heat exchange relationship with respect to said chilled compartment of said refrigerator;

receiving the distilled water from the water vapor condenser into a water collection chamber mounted in said chilled compartment of said refrigerator;

transporting water from said water collection chamber to the water dispenser;

monitoring the level of water in said water collection chamber;

terminating the flow of water into said boiler and the heating of water in said boiler when the water level in said water collection chamber is above a predetermined level;

heating the water in the boiler when the water level in said water collection chamber drops below a predetermined level and the refrigerator compressor is running; and controlling the flow of water from said water source to said boiler based upon the temperature of said boiler.

30. The method of claim 29, and further comprising the steps of removably mounting said boiler to the refrigerator so that it may be replaced when impurities from said heated water have collected therein.

31. A household refrigerator having a water source, a chilled compartment, a freezer, an ice maker, and a water dispenser, the improvement therein of:

water distilling means for generating distilled water for dispensing as drinking water and for forming ice, said water distilling means comprising:

a boiler for receiving water from said water source and means for heating water to a temperature sufficient to boil water in said boiler and to generate steam from the boiled water;

a distilled water collection chamber;

condenser means in communication with said boiler for receiving and condensing the steam generated from boiling the water in said boiler and passing the distilled water to said collection chamber, said condenser means disposed substantially internal to said chilled compartment;

means for transporting the distilled water under pressure from said distilled water collection chamber selectively to said water dispenser or said ice maker;

control means for detecting the amount of water in said collection chamber and controlling the actuation of said distilling means; and a flow control device for controlling the rate of water flow into said boiler so that the water is substantially immediately vaporized upon contact with said boiler.

32. A household refrigerator, comprising:

a chilled compartment and means for maintaining first chilled compartment at substantially 34° and above;

a freezer compartment adjacent to said chilled compartment and means for maintaining said second chilled compartment at substantially 32° and below;

a boiler contiguous said chilled and freezer compartments and means for heating water in said boiler sufficiently to generate steam;

a water source and means for dispensing water from said water source to said boiler;

means for condensing the steam from water heated in said boiler, said means substantially disposed internally to said refrigerator;

means for collecting the purified water generated from condensing said steam, said means substantially mounted in said chilled compartment; and a flow control device for controlling the flow of water from said water source to said boiler so that the water substantially immediately vaporizes upon contact with said boiler.

33. A household refrigerator comprising:

a housing defining an interior compartment, a refrigeration system including a compressor, a condenser, and an evaporator for generating cold coolant fluid for cooling said interior compartment, a boiler contiguous said chilled compartment and means for heating water in said boiler sufficiently to generate steam;

conduit means for dispensing water from a water source to said boiler;

a heat exchanger for transferring heat from said condenser to the water moving through said conduit means toward said boiler;

means for condensing the steam from water heated in said boiler;

means for collecting the purified water generated from condensing said steam and for dispensing the purified water from said housing; and flow control means for controlling the flow of water from said water source to said boiler so that the water substantially immediately vaporizes upon contact with said boiler.

34. The method of claim 16, wherein water received into said boiler is flowing at a controlled rate so that the water substantially immediately vaporizes upon contact with said boiler.

35. The method of claim 21, wherein the preheated water is moving into said boiler at a controlled rate so that the water substantially immediately vaporizes upon contact with said boiler.

* * * * *